United States Patent [19]

Quimet

[11] 3,940,739

[45] Feb. 24, 1976

[54] ALARM REPORTING SYSTEM

[75] Inventor: Donald J. Quimet, Mundelein, Ill.

[73] Assignee: Telephone & Data Products, Inc., Mundelein, Ill.

[22] Filed: July 5, 1974

[21] Appl. No.: 485,840

[52] U.S. Cl............. 340/164 R; 340/167 A; 340/413
[51] Int. Cl.² .................... G08B 13/08; H04Q 1/32
[58] Field of Search ........ 340/147 R, 147 T, 164 R, 340/166 R, 167 A, 168 R, 413, 151, 166; 307/243

[56] References Cited
UNITED STATES PATENTS

| | | | |
|---|---|---|---|
| 2,964,657 | 12/1960 | Page | 307/243 |
| 3,335,404 | 8/1967 | Wood | 340/164 R |
| 3,551,900 | 12/1970 | Annis | 340/166 R X |
| 3,579,146 | 5/1971 | Paine | 307/234 X |
| 3,594,789 | 7/1971 | Rotier | 340/413 |
| 3,614,327 | 10/1971 | Low | 307/243 X |
| 3,705,386 | 12/1972 | Gueldenpfennig et al. | 340/167 A X |
| 3,786,424 | 1/1974 | McVoy et al. | 340/151 |

Primary Examiner—Donald J. Yusko
Attorney, Agent, or Firm—Wolfe, Hubbard, Leydig, Voit & Osann, Ltd.

[57] ABSTRACT

An alarm system for reporting the status of a plurality of remote alarm points to a central monitoring station. An alarm status transmitter is located in the vicinity of the alarm points, and includes a selection matrix having sensing inputs coupled to the alarm points for receiving status signals. The transmitter further includes a clock for causing the sequential scanning of the inputs, and adapted to produce a pulse duration modulated (PDM) output signal in response to the scanned status signals. The monitoring station includes means for receiving and demodulating the PDM signal, and a status display for continually displaying the condition of each of the alarm points. The transmitter and receiver are each provided with simplified interfacing means, allowing the system to be applied using various transmission techniques.

19 Claims, 6 Drawing Figures fig. 1.

ALARM REPORTING SYSTEM

The present invention relates to alarm reporting systems, and more particularly to those adapted to monitor the status of a plurality of remote alarm points via a centralized monitoring station. Such systems are encountered, for example, within the telephone industry where the status of equipment within an unattended office may be monitored at an attended station. Alarms may be arranged to indicate failures in equipment such as ringing generators, battery chargers, heaters and air conditioners, and to indicate such occurrences as fire, smoke, unauthorized entry, etc. It is within the scope of the art to operate a set of electrical contacts in response to conditions such as those set forth above. Alarm reporting systems, of the type considered herein, are adapted to scan a group of inputs represented by the above noted contact sets, and transmit a signal to a monitoring station adapted to display the status of each of the inputs.

While alarm reporting systems are known in the art, the systems known heretofore may generally be characterized as bulky, expensive and/or complex. For example, many of such systems use conventional coding techniques, such as the common ASCII code. Using such techniques for the reporting of a plurality of alarm status inputs requires that multiple ASCII words be produced for reporting a single scan of all inputs. This generally further increases system complexity, in that each word must be coded with address data to indicate the identity of the particular alarm whose status is being reported. Further, many prior art systems include storage means at the reporting station for temporarily holding the data before transmission. Such storage means may take the form of registers operable as parallel to serial converters.

Not only is the prior art reporting station equipment complex, as indicated above, but the monitoring station equipment is generally of comparable complexity. For example, such equipment must interpret individual data words (such as ASCII), extract both data and address, and route the data to the proper location. Certain of such systems include shared displays which require further circuitry for multiplexing the display among the various inputs. Additionally, such shared or multi-purpose displays often introduce the element of operator confusion.

With the foregoing in mind, it is a general aim of the present invention to provide an alarm system having a different operating mode than those known heretofore, in which system complexity is greatly reduced. More specifically, it is an object of the invention to provide an alarm reporting system comprising a minimum number of components and utilizing coded communication techniques wherein encoding, transmission and decoding may be accomplished in a reliable fashion.

A further object is to provide a highly reliable alarm reporting system using circuit techniques which reduce system complexity and the resulting manufacturing cost. In this regard it is an object of the present invention to simplify the identification of individual alarm points by utilizing a code word containing data indicative of the status of each scanned alarm point and having a unique position therein for each alarm point. Likewise, the invention is designed to simplify the reporting station circuitry by providing circuitry which utilizes common components for both scanning and encoding in conjunction with interfacing means allowing flexibility of application.

According to still another aspect of the invention, it is intended to provide a status display at the monitoring station which is easily interpreted. More specifically, it is an object to economically provide an indicator corresponding to each alarm point in the system.

Other objects and advantages will become apparent from the following detailed description when taken in conjunction with the drawings in which.

While the invention will be described in connection with a preferred embodiment, it will be understood that there is no intention to limit it to that embodiment. On the contrary, the intent is to cover all alternatives, modifications and equivalents as may be included within the spirit and scope of the invention as defined by the appended claims.

Figure 1:
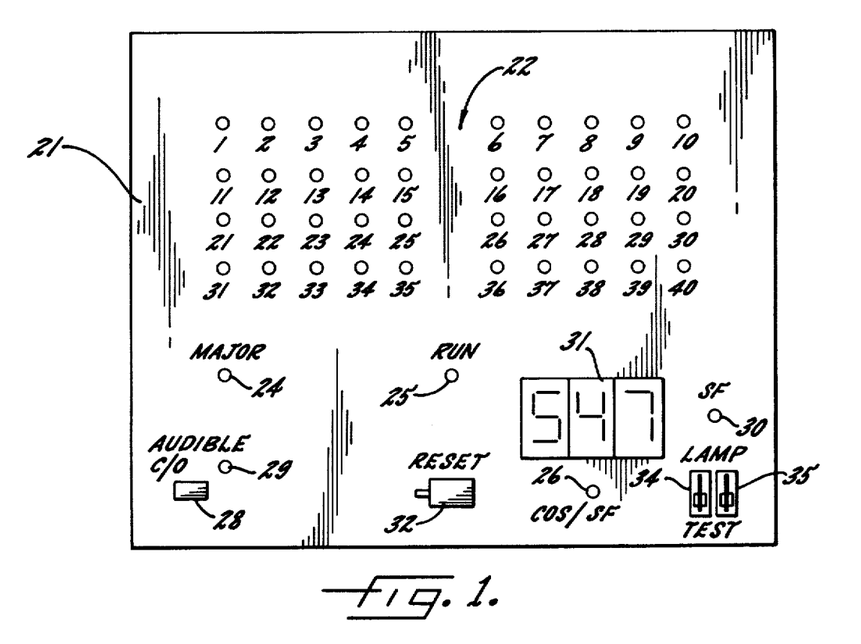
FIG. 1 is an illustrative view of a status display panel suitable for monitoring 40 remote alarm points.

Turning now to the drawings, and particularly to FIG. 1, there is illustrated an exemplary alarm status display panel adapted to indicate the status of each of 40 remote alarm points. The panel 21, as shown, is designed to accommodate a field of 40 status indicators, generally indicated at 22. The status indicating field includes a light emitting diode (LED) corresponding to each alarm point, the illuminated condition of an LED indicating an alarm-on condition for the corresponding point. Additionally, a Major Alarm indicator, LED 24 is provided which is illuminated along with an individual status indicator 22 when a sensed condition has been designated a major alarm.

The display panel also includes a Run indicator, shown herein as LED 25, adapted to flash periodically in response to the receipt of alarm status words from the reporting station, thereby providing a dynamic indication of system operation. To indicate that the status of one or more alarm points has changed (either off to on, or on to off), a Change of Status indicator, shown herein as LED 26, is illuminated and an audible alarm is activated. An Audible Cutout switch 28 is provided to allow an operator to disable the audible alarm if desired. Operating in conjunction with Audible Cutout switch 28 is an indicator 29 provided to indicate the fact that the audible alarm is disabled. To indicate a failure in the alarm system, a System Failure indicator 30 is provided to operate in response to internal self-checking circuitry. The status panel also includes a three digit display 31 for indicating the address of the reporting station whose status is being displayed. Such address display is particularly useful in scanning-type adaptations of the invention, wherein two or more alarm transmitters are scanned by a single alarm receiver. The address indication feature is also useful in multiple transmitter systems wherein an individual status panel is provided for each transmitter, in that a "universal" display panel may be connected to any receiver and will automatically display the address thereof.

Also provided on the status panel is a Reset switch 32 which provides the operator the capability to acknowledge a change of status indication. Depressing such switch after a change of status indication resets the system by extinguishing the Change of Status indicator 26 and silencing the audible alarm, thereby allowing the system to sense further change of status conditions. Also provided are lamp test switches 34 and 35 for testing the indicators during trouble-shooting of the system.

It should be noted that the use of miniaturized, low power components (such as the LED's), in conjunctiown with the simplified reporting scheme to be described more fully hereinafter, allows the economical provision of a receiver and display for each alarm transmitter in the system, thereby eliminating the need to multiplex a single receiver and display.

To monitor each of a plurality of alarm points and report the status thereof to the indicating station described above, means are provided to sequentially scan each of the alarm points, shown herein as an alarm transmitter, including a selection matrix. The alarm transmitter illustrated in FIGS. 2a and 2b includes a selection matrix 43, which is particularly suited to the simplified status reporting scheme taught herein, as it not only scans the various alarm points, but also effectively controls the means for producing the modulated output signal. The matrix includes alarm status inputs SI-1 to SI-40 which form the sensing inputs for the system. It should be noted that although the invention will be described in connection with the reporting of 40 status points per reporting station, it will be apparent that the system may be arranged to include either a greater or lesser number. Other sensing inputs to the matrix are major alarm sensing input 41 and address inputs 42, which are prewired in accordance with the address assigned to the reporting station.

Figure 2A:
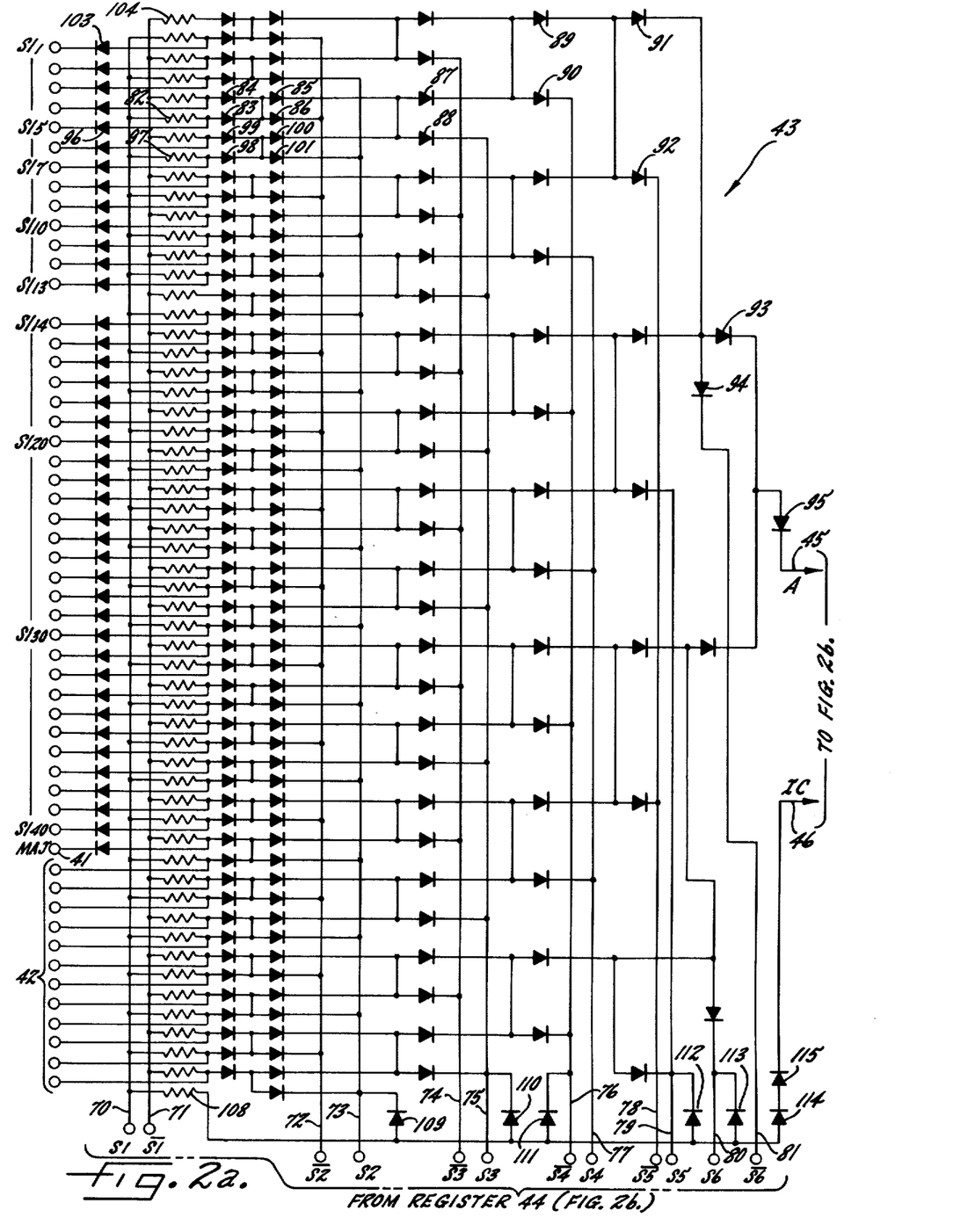
FIGS. 2a and 2b when joined, form a circuit schematic of an alarm transmitter constructed in accordance with the present invention.
Figure 2B:
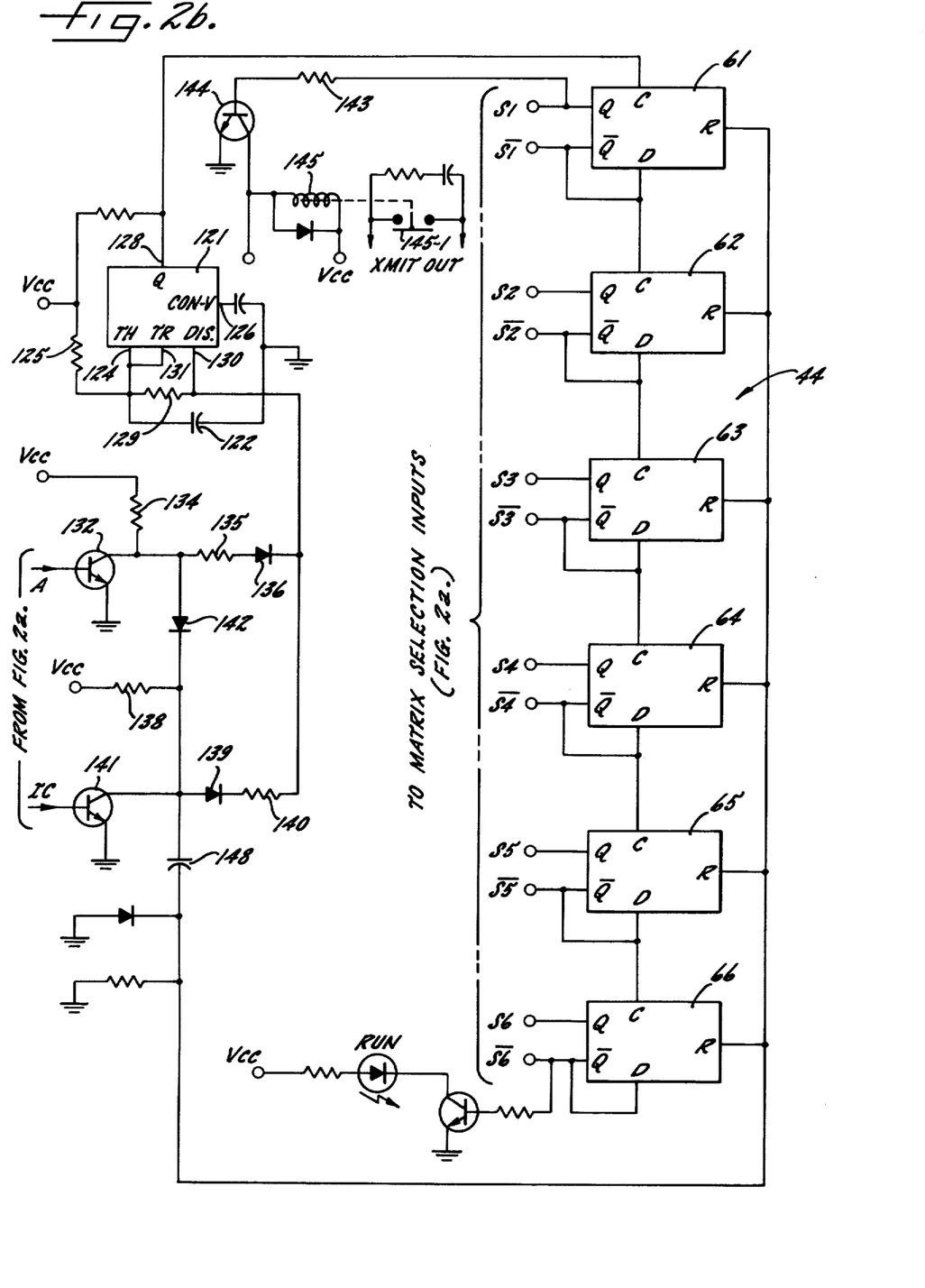

Illustrated at right angles to the sensing inputs are selection inputs which, in a preferred embodiment, are coupled to the outputs of a binary register 44. Accordingly, the matrix sensing inputs are isolatingly combined in a binary progression from the plurality of sensing inputs to a matrix output 45. Such convergence of signal paths is controlled by the selection inputs in accordance with the state of the binary register 44. As will become apparent, the circuitry is arranged to successively enable individual paths from each of the sensing inputs to the single matrix output. In practicing the invention, a second matrix output is provided for indicating the termination of a complete scan of all of the inputs, shown herein as intercode output 46.

Figure 3:
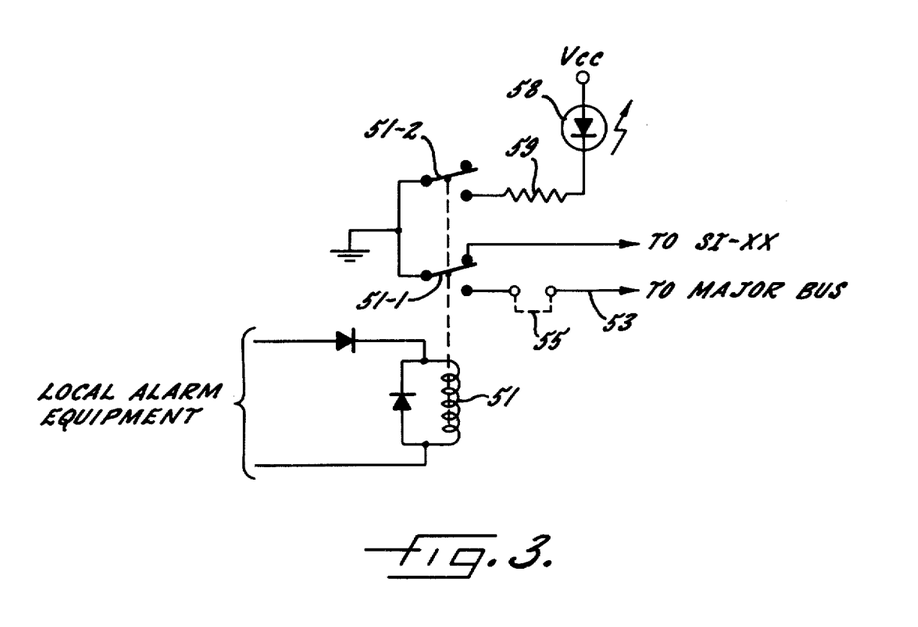
FIG. 3 is a circuit schematic of an interface for coupling an alarm point to its corresponding transmitter status input.

Recalling that the means for detecting an alarm condition may take the form of a pair of electrical contacts, means are provided responsive to such contacts for coupling an alarm-off or alarm-on status signal to the matrix. One embodiment of such means is illustrated in FIG. 3, including an interfacing relay 51 having both local and remote status reporting capabilities. It will be understood that an interfacing relay is provided for each alarm point. For sensing the alarm status, the coil of relay 51 is coupled to the alarm detecting contacts (not shown). In the illustrated embodiment, the detecting contacts are adapted to energize the relay 51 in response to an alarm condition, and to allow the relay to remain deenergized in the absence of an alarm condition. The relay 51 includes remote status indicating contacts 51-1, which, in their deenergized or alarm-off condition, apply a ground signal to the status input SI-xx corresponding to the particular interfacing relay. In response to the detection of an alarm condition, the relay 51 is energized by the detection equipment, causing contacts 51-1 to assume their alternate position, and removing the ground signal from the status input SI-xx of the matrix. The resulting open-circuit condition seen by the matrix may be termed an alarm-on signal. A jumper 55 may be installed between contacts 51-1 and the major bus 53 as illustrated, the major bus in turn being coupled to major alarm input 41. Installation of jumper 55 on one or more interfacing relays serves to designate the corresponding alarm points as major alarms. Upon activation of an alarm point thus designated as major, the ground signal, which is removed from the status input to indicate an alarm condition, is applied to the major alarm input 41 to indicate a major alarm condition. It is apparent that the omission of jumper 55 designates the corresponding alarm point as minor. The reporting station may also be provided with local alarm status indication if desired. Such indication is controlled by contacts 51-2, which, in response to energization of relay 51, complete a circuit between a positive supply of voltage and ground through light emitting diode 58 and current limiting resistor 59. Thus, if a particular alarm point goes into an alarm condition, indication may be provided both at the local and at the remote monitoring stations.

In practicing the invention, means are provided for sequentially scanning each status input and producing an output digital word containing data indicative of the status of each of said inputs. Referring again to FIGS. 2a and 2b, a binary register, generally indicated at 44, is comprised of six flip-flops 61–66, having their complementary outputs coupled in a binary pattern to the selection inputs of the matrix. The count within the register 44 is advanced by a timer 121, whose period, in turn, is controlled by the matrix output 45.

For illustrating that any count contained within shift register 44 enables only one path between the selected status input and the matrix output 45, current paths through the matrix will be traced assuming a count of five within the shift register 44. As flip-flop 61 is the least significant bit, a count of five provides a high signal on the Q outputs of flip-flops 61 and 63 (S1 and S3) and the $\bar{Q}$ outputs of flip-flops 62, 64, 65 and 66 ($\overline{S2}, \overline{S4}, \overline{S5}$ and $\overline{S6}$) thereby driving busses 70, 72, 75, 76, 78 and 81 high, and clamping busses 71, 73, 74, 77, 79 and 80 to ground.

In this condition, the high signal on selection bus 70 causes current flow through each resistor coupled thereto. However, it will be appreciated that all but one of such paths will be blocked before reaching the matrix output due to the status of register 44. Current will flow through resistor 82 and diode 83, which has its cathode coupled to the cathode of diode 84 and to the anodes of diodes 85 and 86. As the register 44 is holding bus 72 at a high level, diode 86 will be reverse biased, allowing current flow through diode 85 to the common anodes of diodes 87 and 88. Similarly, flip-flop 63 within register 44 maintains bus 75 at a high level, reverse biasing diode 88 and allowing current flow through diode 87 to the common anodes of diodes 89 and 90. Diode 90 is reverse biased by virtue of the high signal on bus 76, allowing current flow through diode 89 to the common anodes of diodes 91 and 92. In a similar fashion, diode 92 is reverse biased by bus 78, allowing current flow through diode 91 to the common anodes of diodes 93 and 94. Diode 94 is reverse biased due to the high signal on bus 81 allowing current flow through diode 93 and diode 95 to the base of the clock control transistor 132. Thus, a signal path for the 5 count within the register 44 has been traced from status input SI-5 to the matrix output 45.

In practicing the invention, such signal path is made responsive to the alarm status coupled to status input SI-5. Recalling that a ground will be applied to status input SI-5, if the corresponding alarm point is in an alarm-off condition, it is seen that each ground signal will forward bias diode 96, and thus block the current path described above. This signal blocking results in the production of an output pulse of a first characteristic duration. If, however, the corresponding alarm point is in an alarm-on condition, the ground signal is removed from the input SI-5, thereby preventing the forward biasing of diode 96, and allowing current flow through the path described above. This current flow, acting through the clock circuitry to be described below, causes the production of an output pulse of a second characteristic duration.

To illustrate that all other current paths are blocked for the register condition described above, the path for input SI-7 will be traced. The positive signal on bus 70, which causes current flow through resistor 82, also causes current flow through resistor 97. Such path is through diode 98 whose cathode is connected to the cathode of diode 99 and the anodes of diodes 100 and 101. Recalling that bus 73 is at a low level due to the state of flip-flop 62, it is seen that diode 101 is forward biased, thus clamping its anode to ground and blocking the current path to the matrix output. In other words, as the current path is through resistor 97, diode 98, diode 101 and flip-flop 62 to ground, there is no complete current path from input SI-7 through the matrix to the output thereof for the illustrated register condition. All other sensing current paths may be traced in this manner to discover a current sink for each path before said path reaches the matrix output.

With the foregoing in mind, it will be apparent that with a count of zero in register 44, the uppermost level of the matrix is enabled, and as the register is incremented in units of one, successive levels are sequentially enabled. In the illustrated embodiment of the matrix, two levels thereof, namely those responsive to the counts of 0 and 14, are not associated with status inputs, but are incorporated to provide an error checking capability within the output signal. Each of these inputs will cause current flow to the matrix output when enabled.

The matrix levels responsive to the counts of 1–13 and 15–41 are coupled to associated status inputs. Accordingly, such inputs, when enabled, cause current flow to the matrix output in an alarm-on condition, and prevent such current flow in an alarm-off condition. The matrix level which is enabled by the count of 42 is coupled to the major alarm input 41. Recalling that the input to such alarm is normally maintained in an open circuit condition, and that the occurrence of a major alarm imposes a ground on input 41, it is seen that, when enabled, such input causes current flow to the matrix output in the alarm-off condition, and prevents current flow in the alarm-on condition. The 12 inputs 42 following major alarm input 41 are provided to include the address of the reporting station within the output signal. An address may be assigned to a station by connecting selected ones of the inputs 42 to ground in a 3 digit BCD pattern representing the assigned address, to control current flow to the matrix output when such inputs are sequentially enabled.

After a scan of all the inputs described above, the register 44 is incremented to a count of 55, driving busses 70, 73, 75, 76, 79 and 80 high, and clamping busses 71, 72, 74, 77, 78 and 81 to ground. This condition sets up a current path from bus 70 through resistor 108 to the common anodes of diodes 109–114. As diodes 109, 110, 111, 112 and 113 are each reverse biased by the potentials on busses 73, 75, 76, 79 and 80 respectively, current flow is allowed through diodes 114 and 115 to the intercode output 46, to produce a word termination or intercode signal.

In accordance with the invention, to control the sequencing of register 44 and to produce timing pulses having a variable period controlled by the sensed status on the selected inputs, clock means are provided including a timing element having a variable operating frequency, shown herein as timer 121. While the timer may be implemented by various means known to the art, in a preferred embodiment, a commercially available integrated circuit, the Signetics NE555V, is used.

The components associated with timer 121 include a timing capacitor 122 coupled between the timer threshold input 124 and ground. Resistor 125, coupled between a suitable supply of positive voltage and the common connection of capacitor 122 and threshold input 124 is arranged to charge capacitor 122 at a known rate. Control voltage input 126 provides an internally generated reference level for comparison with the voltage applied to the threshold input 124. When the voltage on capacitor 122, as seen at threshold input 124, reaches a known value, timer 121 is triggered. Such triggering causes the timer output 128 to be driven from a high to a low level and causes capacitor 122 to be discharged through resistor 129 by the discharge input 130 of timer 121. As the trigger input 131 of timer 121 is coupled to timing capacitor 122, the rapid discharge of such capacitor also provides a trigger pulse for timer 121. Thus, the cicuit is arranged to operate as an astable multivibrator having a period controlled by the values of resistor 125 and capacitor 122. As illustrated, the timer output 128 is coupled to the clock input of flip-flop 61 for sequencing the register 44.

For varying the period of timer 121, auxiliary timing paths, responsive to the matrix outputs, are provided for charging capacitor 122. Transistor 132 has its base coupled to the matrix output 45 and accordingly conducts when current is supplied to the matrix output 45, and is cut-off when the current paths are blocked. When transistor 132 is cut-off, a secondary charging path for capacitor 122 is provided from the positive supply through resistor 134, resistor 135, diode 136 and resistor 129. However, when transistor 132 is conducting, its collector is clamped near ground, reverse biasing diode 136 and disabling the secondary charging path. Diode 136 provides isolation to allow the timer to continue functioning when such secondary charge path is disabled. Similarly, an auxiliary charging path including resistor 138, diode 139, resistor 140 and resistor 129 is disablingly controlled by intercode transistor 141, which in turn is caused to conduct only when current is provided to intercode output 46. Accordingly, such charge path is enabled when intercode transistor is in its normally off condition, and disabled when the intercode transistor 141 is conducting. Additionally, diode 142, coupled between the collectors of transistors 141 and 132 is provided to disable the resistor 135 charging path when transistor 141 is conducting.

In summary, the circuitry described above provides timer 121 with three operating periods. When intercode transistor 141 is conducting, the timer has only a single charging path for capacitor 122, through resistor 125, thereby providing the longest timing interval. In one embodiment of the invention, the components are selected to provide a 100 millisecond period for this condition, termed the intercode period. A second intermediate period is provided when transistor 141 is nonconducting but transistor 132 is conducting, thereby allowing capacitor 122 to be charged through the parallel combination of resistor 125 and resistor 140. As will become apparent, this condition is the data 1 output condition, and may be arranged for a period of 40 milliseconds between succeeding pulses. The shortest timing interval is provided when both transistors 132 and 141 are switched off, allowing the charging of capacitor 122 through the parallel combination of resistor 125, resistor 135 and resistor 140. As will become apparent, this is the data 0 condition and may be arranged to provide a period of 20 milliseconds between pulses.

The interrelationship between the matrix, the register, and the variable frequency clock set forth above, results in a series of clock pulses, with the period between successive pulses indicating the status of the scanned matrix inputs. In accordance with the invention interfacing means are provided for producing a pulse duration modulated (PDM) signal in response to the clock pulses. Accordingly, a transistor 144 has its base coupled via a current limiting resistor 143 to the Q output of flip-flop 61. As the flip-flop 61 changes state in response to each clock pulse, it is seen that the Q output alternates between the logic 0 and logic 1 levels, with each logic level maintained for a duration corresponding to the status of the input which is then coupled to the matrix output. Thus, transistor 144 is alternately switched on and off for corresponding periods, thereby alternately energizing and deenergizing a relay 145 coupled in the transistor load circuit, causing relay contacts 145-1 to produce the transmitter output signal.

It should be noted that the scanning and output signal production are accomplished by common components, and without the need for registers for accepting and storing status signals, or parallel to serial converters for producing an output signal.

To further illustrate the interrelationship between the matrix, the register, and the variable frequency clock in both scanning the inputs and producing the output signal, the following description of a typical scan cycle is presented. At the initiation of a scan, register 44 is in the zero condition, which (a) causes output relay contacts 145-1 to remain open and (b) provides a current path through matrix resistor 104 to the matrix output 45. Such current path causes transistor 132 to conduct, thereby disabling the resistor 135 charging path. Thus, timer output 128 remains in a low condition for a period of 40 milliseconds, after which a brief positive pulse is produced. Such positive pulse is coupled to the clock input of register 44, incrementing the register to the count 1. In response, the Q output of flip-flop 61 is driven high, which (a) energizes transistor 144, thereby closing the output relay contacts 145-1, and (b) enables the second matrix level, namely the level coupled to the status input SI-1. Assuming that the status input is in the normal alarm-off condition, current flow to the matrix output 45 will be disabled due to the sinking of current by the interfacing relay 51 through diode 103. In this condition, both transistors 132 and 141 will be cut off, enabling both supplementary charge paths, and causing the timer 121 to operate with a period of 20 milliseconds. At the end of such period, the timer will generate a pulse to increment register 44 to the 2 count. Accordingly, contacts 145-1 will be opened while the third matrix level is scanned, namely the path coupled to status input SI-2. In a manner similar to that described above, each matrix level is scanned in turn, and relay contacts 145-1 alternately opened and closed in synchronism therewith, with the length of time the scan dwells at each input being determined by the status of such input. More specifically, the first and fourteenth levels will always be scanned for 40 milliseconds (for error checking), each status input will be scanned for 20 milliseconds if off or 40 milliseconds if on, the major alarm input will be scanned for 40 milliseconds if off and 20 milliseconds if on, and the address inputs will be scanned for 40 milliseconds for a data 1 and 20 milliseconds for a data 0 with the pattern indicating a 3 digit BCD address. After the scanning, in the proper order, of all of the above noted matrix levels, the register 44 is incremented to the 55 count, causing intercode transistor 141 to conduct. This condition disables both secondary charge paths, causing timer 128 to dwell upon the count 55 (with relay contacts 145-1 closed) for a period of 100 milliseconds, thereby signaling the monitoring station that the succeeding pulse will be the first bit of a new word. For resetting the register 44 after the intercode period, the collector of transistor 141 is coupled to a differentiating capacitor 148, to produce a reset pulse at the rising edge of the intercode pulse. In other words, the timer 121 produces a trigger pulse at the termination of the 100 millisecond period which increments the register to the 56 count. As this removes the base drive from transistor 141, causing it to turn off, the off turning condition is differentiated by capacitor 148, which immediately produces a reset pulse which is coupled to the reset inputs of register 44, causing the register to again assume the zero condition to initiate a new scan cycle.

In summary, the alarm transmitter is adapted to sequentially scan the matrix inputs and produce a PDM signal indicating the status of the scanned inputs. In a preferred embodiment, the output PDM signal is produced by relay 145, with contacts 145-1 alternately opening and closing for successively scanned matrix levels, the length of the individual open or closed periods imparting the intelligence to the signal. As will be described in greater detail below, the PDM signal is transmitted to the central monitoring station, where the intelligence is extracted and the status of all alarm points displayed. With regard to the transmission means, suffice it to say for the moment, that a signal is provided to the alarm receiver capable of alternately energizing and deenergizing interfacing means shown herein as a relay coil 201 generally in synchronism with the closing and opening of relay contacts 145-1.

Figure 4A:
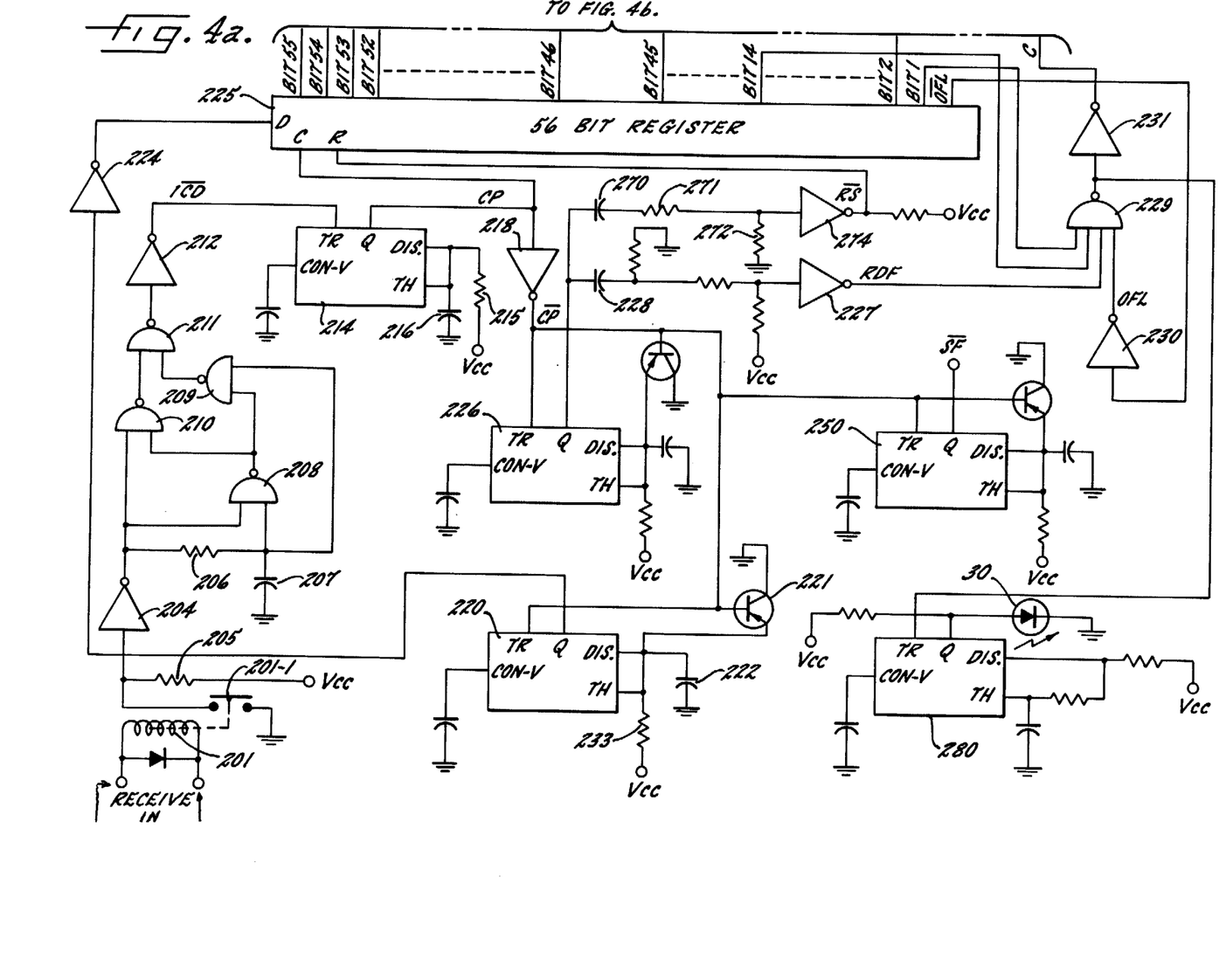
FIGS. 4a and 4b, when joined form a circuit schematic of an alarm receiver constructed in accordance with the present invention.
Figure 4B:
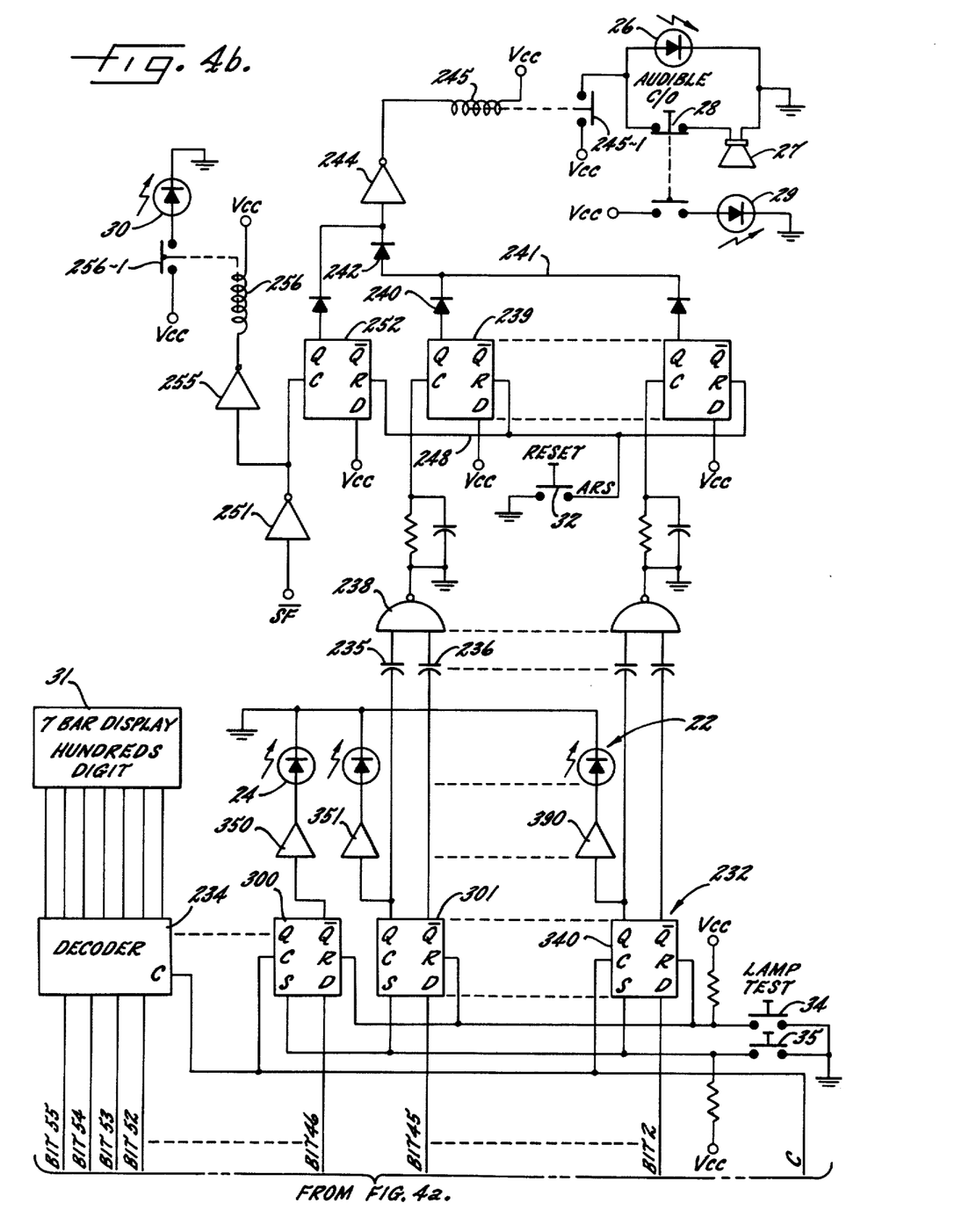

Turning now to FIGS. 4a and 4b, there is shown the alarm receiver including a relay 201 having a coil coupled to the transmission means for receiving the PDM signal. The relay 201 has normally open contacts 201-1 coupled between ground and the input of inverter 204. Additionally, resistor 205 is coupled between a suitable supply of DC voltage and the input of inverter 204. Such arrangement causes the inverter output to be driven to a logic 0 when the relay contacts 201-1 are open, and to a logic 1 when the relay contacts 201-1 are closed.

In practicing the invention, the receiver is provided with means responsive to the received PDM signal for recovering the transmitter clock signal therefrom, thereby to decode the status of each of the alarm points. Accordingly, edge detection circuitry is coupled to inverter 204 for detecting transitions in the PDM signal. Such circuitry includes delay means, comprising resistor 206 and capacitor 207, coupled to one input of each of NAND gates 208 and 209. The output of inverter 204 is coupled directly to the other input of NAND gate 208 and to one of the inputs of NAND gate 210. NAND gate 211, having its inputs coupled to the outputs of NAND gates 209 and 210, provides the output of the edge detection circuitry, producing a brief positive pulse at each transition of the PDM signal. For example, when the output of inverter 204 switches from a low to a high level, NAND gate 210 is temporarily satisfied for a period necessary to charge capacitor 207, providing a logic 0 input to NAND gate 211, and causing its output to briefly go to a logic 1. The rising voltage on capacitor 207 ultimately satisfies NAND gate 208, driving the corresponding input to NAND gate 210 low, and thus driving the output of NAND gate 211 low. Similarly, when the output of inverter 204 switches from a high to a low level, NAND gate 209 is temporarily satisfied for the time necessary to discharge capacitor 207, causing a brief positive output from NAND gate 211. It is apparent that, in producing a pulse at each transition in the PDM signal, the edge detection circuitry serves to recover the transmitter clock signal by providing an indication of the period of each pulse in such signal.

The positive pulses, produced at the output of NAND gate 211, are inverted by inverter 212 and coupled to the trigger input of a timing circuit 214, which may be implemented using an NE555V integrated circuit timer. The timing components associated with such circuit, resistor 215 and capacitor 216, are selected to provide a delay period sufficient to eliminate the effects of relay contact bounce. More specifically, the timer is arranged to detect the signal produced by a transition in the PDM signal, and to ignore subsequent transitions for a brief period thereafter, such as those which might be caused by the bounce of relay contacts 201-1. Thus, a single brief trigger pulse is produced at the output of timer 214 in response to each PDM signal transition. Inverter 218 inverts the pulse and couples the resulting negative trigger pulses to a series of detecting timers. Such timers may also be implemented by the Signetics integrated circuit described above, used in a slightly different operating mode. Referring to timer 220, it is seen that transistor 221 is arranged to be driven into conduction by the trigger signal, for discharging timing capacitor 222. Thus, a trigger signal will serve to initiate a timing period when timer 220 is in its "timed-out" condition, and to reinitiate a progressing timing period by discharging capacitor 222. Such arrangement is commonly referred to as a retriggerable multivibrator or missing pulse detector. The values of the timing components, namely resistor 223 and capacitor 222, are selected to provide a period intermediate the data 1 and data 0 pulse durations, or, in the illustrated embodiment, approximately 30 milliseconds.

It will be appreciated from the foregoing description that when the timer 220 is in its timed-out condition, the receipt of a trigger pulse from inverter 218 will cause the timer output to be driven from a low to a high level. If trigger pulses are reapplied at 20 millisecond intervals (indicating a succession of data 0's) the output of timer 220 will remain in the logic 1 state. However, if the PDM signal includes a pulse of 40 milliseconds duration (indicating a data 1), the timer 220 will be allowed to time out, driving the output thereof to a logic 0 after the 30 milliseconds timing period. Of course, the next PDM transition will again trigger the timer to continue the cycle. Accordingly, the timer 220 output signal, when viewed at the instant of PDM signal transitions (as indicated by timer 214) may be taken as the demodulated PDM signal, the logic 1 output level indicating a 20 millisecond pulse duration, and the logic 0 output level indicating a 40 millisecond pulse duration.

For accepting the demodulated signal and structuring a digital word including a bit corresponding to each matrix level, a serial to parallel converter shown herein as register 225 is provided. Accordingly, the timer 220 output is coupled via inverter 224 to the data input of register 225. For causing the register to store a data bit in response to each PDM signal transition, the output of timer 214 is coupled to the clock input of the register 225. Thus, the receiver serves to extract the status information from the PDM signal and store such information in register 225.

In order to correlate individual bits within the register 225 with their assigned functions, means are provided to detect the intercode bit, and to provide a strobe signal in response thereto. It will be appreciated that receipt of an intercode bit is a first indication that the individual data bits are loaded in their predetermined respective locations in the register 225.

To detect the intercode bit, a timer 226 is provided, arranged like timer 220 is but having a period which is greater than the duration of a data 1 pulse, and less than the duration of an intercode pulse, such as 65 milliseconds. As the timer 226 is triggered by the output of inverter 218, which also triggers timer 220, the output of timer 226 will remain at a logic 1 until an intercode bit is received, at which time the output will be driven to a logic 0. Inverter 227 and its associated components, including differentiating capacitor 228, are provided to detect the trailing edge of the timer 226 output signal and produce a brief positive pulse in response thereto. That pulse is coupled to one of the inputs of four input NAND gate 229. The remaining three inputs of NAND gate 229 are coupled to predetermined stages of register 225 for checking the legitimacy of the word contained therein. More specifically, two of the inputs are coupled to the stages which contain the error checking bits, which it is recalled, are in the first and fourteenth positions of the data word. Therefore the transmitter must accurately encode, and the receiver accurately decode data 1's in both error checking positions in order for the data word to be considered legitimate. Additionally, an overflow stage is provided in the register and coupled via inverter 230 to one of the inputs of NAND gate 229. If a logic 1 appears in such position in the register, it indicates that the message has been improperly shifted, and accordingly prevents further processing of the illegitimate message. Thus, a legitimate message is detected by NAND gate 229 when the overflow stage of register 225 is low, both error checking stages are high, and inverter 227 signals the receipt of a synchronizing intercode bit. The simultaneous presence of these four signals at the input of NAND gate 229 drives the output thereof low. The output signal is inverted by inverter 231 and coupled to the clock inputs of display register 232 thereby causing the parallel strobing of the information contained in register 225 into the display register 232.

While only flip-flops 300, 301 and 340 are illustrated, it is apparent that the display register 232 includes a plurality of flip-flops 300–340 having a stage corresponding to each of the alarm points. The flip-flop outputs are coupled to drivers 350–390 to illuminate associated indicators (LED's 22 of FIG. 1) to display the status of each of the alarm points. Flip-flop 300 within display register 232 and driver 350 correspond to the major alarm bit of register 225, while flip-flops 301–340 and drivers 351–390 correspond to the respective alarm points. It is of note that the alarm point drivers 351–390 are coupled to the Q output of their associated flip-flops, while the major alarm driver is coupled to the $\bar{Q}$ output of flip-flop 300 because of the inverted logic associated with the major alarm. Additionally, the twelve address bits contained within register 225 are strobed into binary to seven segment decoders, only decoder 234 corresponding to the hundreds digit being illustrated, for driving the seven segment displays 31 described in conjunction with FIG. 1. The lamp test switches 34 and 35, also shown in FIG. 1, are coupled to the reset and set inputs respectively of register 232 for manually controlling the indicators 22 for test purposes.

Recalling that the detection of an intercode pulse caused timer 226 to produce a negative pulse, and that the trailing edge of such pulse was differentiated to produce the aforementioned strobing action, it is seen that a similar differentiator is provided for responding to the leading edge of the timer 226 pulse. Such differentiator, including capacitor 270, resistors 271 and 272 and inverter 274, is adapted to reset register 225 in preparation for the reception of a new data word.

For detecting a change in status of any of the alarm points, means are provided for monitoring the outputs of register 232, for detecting and indicating register output stage changes. FIG. 4b illustrates that both the Q and $\bar{Q}$ outputs of each of the stages of register 232 are coupled through associated capacitors, such as 235 and 236, to the inputs of a multiple input NAND gate such as NAND gate 238. The output of NAND gate 238 is normally maintained at a logic 0, and is briefly driven to a logic 1 in response to a transition within register 232. The mechanism for providing this brief logic 1 output is the charging of a coupling capacitor 235 or 236 in response to the associated input switching from a high to a low level thereby briefly disabling NAND gate 238. As both the Q and $\bar{Q}$ outputs of each of the register stages are coupled to the change of status detector, it is seen that both changes to an alarm condition, and from an alarm condition are detected. Storage means are provided for responding to the brief pulses described above to produce a maintained change of status signal. For example the output of NAND gate 238 is coupled to the clock input of a flip-flop 239. As the data input of such flip-flop is coupled to a suitable supply of positive voltage, the production of a clock pulse by NAND gate 238 will cause the Q output of flip-flop 239 to be driven to a logic 1.

The Q output of each of the flip-flops such as flip-flop 239 are coupled through isolating diodes such as diode 240 to a change of status bus 241. Accordingly, in response to the detection of a change of status, a flip-flop such as flip-flop 239 drives bus 241 to a high level which causes current flow through diode 242 and driver 244 to energize alarm relay 245. In response thereto, the normally open alarm relay contacts 245-1 close, to light the change of status indicator (LED 26 on FIG. 1) and to sound the audible alarm 27.

For allowing an operator to acknowledge a change of status alarm, a bus 248 coupled to the reset inputs of each of the flip-flops such as flip-flop 239 is arranged to be driven by the reset switch 32, located on the status display. A temporary depression of such switch by the operator generates a signal to reset the change of status storage means, thereby removing the driving signal from bus 241 and deenergizing alarm relay 245.

In order to provide a measure of internal self-checking, a timer 250 (FIG. 4a) arranged similarly to timers 220 and 226, but having a relatively long time period such as 5 seconds, is triggered by the inverter 218 pulses concurrently with timers 220 and 226. It will be appreciated that the output of timer 250 is normally maintained at a logic 1, and will be driven to a logic 0 if no trigger pulses are received for a period of 5 seconds. As the longest interval between trigger pulses in a properly functioning system can be no greater than the intercode period, timer 250 is adapted to indicate a system failure. If a malfunction allows timer 250 to time out, the timer output $\overline{SF}$, which is coupled to the input of inverter 251 (FIG. 4b) provides a clock signal to flip-flop 252. In response thereto, the flip-flop output is driven to a logic 1 which, acting through driver 244 energizes alarm relay 245, with the result described above. Additionally, the output of inverter 251 is coupled through driver 255 to energize system failure relay 256, closing contacts 256-1 to illuminate the system failure indicator 30 (described with reference to FIG. 1). The aforementioned reset switch 32 is also coupled to the reset input of flip-flop 252 for silencing the audible alarm resulting from a system failure condition.

A final timer 280 is provided for causing the Run indicator 30 to flash in response to the reception of legitimate messages. Accordingly, the timer has its trigger input driven by NAND gate 229, and has its time period set to cause the Run indicator to be illuminated for a portion of each message reception period. It is apparent that in the normal situation where no alarms are being reported, the flashing Run indicator is the only dynamic indication of system operation.

In accordance with an important aspect of the invention, communication between the alarm transmitter and alarm receiver is made adaptable to various overall system requirements. This flexibility is achieved in part by the simplified interfacing cicuitry wherein the output of the transmitter may be taken as a contact closure while the input of the receiver may be viewed as a relay coil. While the use of relay interfacing might at first appear to reduce the overall system sophistication, it will become apparent that such interfacing actually increases the applicability of the system by allowing the use of numerous transmission techniques and equipment for coupling the transmitter signal to the receiver. For example, the transmission means coupling the units may take the form of a simple dedicated pair of wires including a power souce forming a series circuit between the transmitter contacts and the receiver coil. Alternatively, the units may be applied in conjunction with appropriate modums or data sets to allow coupling by ordinary telephone lines. A data set which may be used in such an application is manufactured by GTE Lenkurt of San Carlos, Calif. and is designated the 25 C Data Transmission System. That particular system uses FSK modulation techniques, and further allows frequency multiplexing of a plurality of channels. Additionally, the system accepts a relay contact closure as an input and provides an output signal suitable for driving a relay coil.

As a further example of a usable transmission technique, the alarm reporting system disclosed herein lends itself to extremely high transmission speeds when used with a direct data link. In such an application, a dedicated pair of lines is provided, with the transmitting end being driven directly by transistor 144 (FIG. 2b), and the receive end coupled directly to the input of inverter 204 (FIG. 4a). Such a system eliminates the input and output relays thereby allowing the system to operate at "electronic speed". Alternatively, to optimize interfacing, commercially available line drivers and line receivers may replace the transmit and receive relays respectively.

It will be appreciated that the system taught herein accomplishes encoding, transmission and decoding of alarm status signals in an efficient manner without sacrificing system integrity. More specifically, relatively low digital words are used, with each word having a bit corresponding to each matrix level, thereby reporting all alarm points in every scan. Accordingly, the only internal addressing within the system is accomplished by the bit position within a word. The techniques utilized allow such a simplified arrangement, while avoiding the potential problems which might arise from cumulative timing tolerance buildup within such a long word. As demodulation is dependent only upon the period between adjacent transitions in the modulated signal, and is not affected by prior transitions, the alarm reporting system may make effective use of the relatively long digital words, and additionally may incorporate the simplified relay type input-output means.

I claim as my invention:

1. An alarm reporting system comprising in combination, a selection matrix having a plurality of alarm inputs, selector means coupled to the matrix for sequentially selecting each of the alarm inputs, clock means for producing a clock signal for sequencing the selector means, means coupling the matrix to the clock means and responsive to the status of the selected alarm input for controlling the period of said clock signal, interfacing means for producing a two level output signal including the clock period, means for coupling the output signal to a transmission means for transmission to a second station, and monitoring means at the second station, including means for receiving the transmitted signal and recovering the clock period therefrom, and means responsive to the period of the recovered clock signal for indicating the status of each of the alarm inputs.

2. An alarm reporting system comprising in combination, scanning means including a selector matrix for producing a PDM signal, said PDM signal including pulse periods having a first or a second duration for indicating the status of each of a plurality of alarm points, means for transmitting the PDM signal to a monitoring station, said monitoring station including interfacing means responsive to the transmitted signal for producing a two level received signal corresponding to the PDM signal, means for detecting transitions in the received signal, means for demodulating the received signal including means for comparing the period between transitions to a predetermined time period for detecting pulse periods of said first and second durations, and means responsive to the demodulated signal for indicating the status of each of the alarm points.

3. In an alarm reporting system having an alarm transmitter for monitoring the status of a plurality of alarm points and producing a PDM signal representing the status of each of the alarm points, and an alarm receiver located at a distance from the alarm transmitter for responding to the PDM signal to display the status of each of the alarm points, the combination comprising, a transmitter interface circuit including a semi-conductor switch having an input coupled to the alarm transmitter so that said switch is opened and closed in response to the PDM signal, and a first relay having a coil driven by the semi-conductor switch and contacts responsive to the coil; a receiver interface circuit including a second relay having a coil and contacts responsive to the coil, the contacts of the second relay being coupled to the alarm receiver; and means for coupling said interfaces so that the coil of the second relay responds to the contacts of the first relay, thereby to couple the PDM signal produced by the alarm transmitter to the alarm receiver.

4. An alarm reporting system for indicating the status of each of a plurality of alarm points comprising in combination, a multilevel matrix having a plurality of sensing inputs, a plurality of selector inputs and an output, means for coupling individual ones of the alarm points to associated sensing inputs for producing individual alarm status signals, selector means coupled to the matrix selector inputs for coupling individual ones of the sensing inputs to the matrix output, clock means for sequencing the selector means, means for coupling the matrix output to the clock means for controlling the period between successive clock pulses, whereby the clock signal contains information indicating the status of each of the alarm points, first interfacing means responsive to the clock means for producing an output signal having a transition corresponding to each of the clock pulses, means including transmission means for coupling the output signal to a monitoring station, said monitoring station including second interfacing means for receiving the output signal, means responsive to the period between the transitions of the received output signal for extracting the status information, and means responsive to the extracted status information for indicating the status of each of the alarm points.

5. The alarm reporting system as set forth in claim 4 wherein the first interfacing means includes a relay having a coil responsive to the clock means and contacts coupled to the transmission means, and the second interfacing means includes another relay having a coil coupled to the transmission means and contacts coupled to the extracting means.

6. The alarm reporting system as set forth in claim 5 wherein the extraction means includes means for establishing a predetermined time period, means for detecting transitions in the received output signal, and means for comparing the period between transitions to the predetermined period.

7. The alarm reporting system as set forth in claim 5 wherein the extraction means includes a retriggerable multivibrator, a timing circuit coupled to the multivibrator for setting the period thereof, means for producing a trigger signal in response to each transition of said received output signal, and means for coupling said trigger signals to the multivibrator trigger input.

8. The alarm reporting system as set forth in claim 5 wherein the multi-level matrix comprises a plurality of signal paths converging from the sensing inputs to the matrix output, and a plurality of selecting paths coupled to the selector inputs and intersecting the signal paths, whereby the intersections between said paths allow independent selection of signal paths between individual ones of the sensing inputs and the output.

9. The alarm reporting system as set forth in claim 8 wherein the signal paths converge according to a binary progression, the selector means comprising a binary register.

10. The alarm reporting system as set forth in claim 5 further including an intercode matrix level and a second matrix output, the selector means being adapted to couple the intercode matrix level to the second output when sequenced thereto, and means for coupling the second matrix output to the clock means for producing an intercode period between successive scans of the alarm points.

11. The alarm reporting system as set forth in claim 10 further including means coupled to predetermined sensing inputs for producing error checking signals at predetermined points in the sequential scan, the monitoring station including means responsive to the error checking signals for verifying the status information, and means responsive to the verifying means for enabling the indicating means.

12. The alarm reporting system as set forth in claim 5 wherein the monitoring station further includes storage means responsive to the extracting means for storing the status information, means for coupling the storage means to the indicating means, means responsive to the storage means for detecting changes in the stored status information, and means responsive to the detecting means for producing a change of status indication.

13. An alarm system for scanning and reporting the status of a plurality of alarm points comprising in combination, a matrix having a plurality of sensing inputs coupled in isolatingly converging paths to an output, said matrix also having a plurality of selecting inputs, selection means coupled to the selecting inputs for individually enabling the matrix paths, means responsive to the alarm points for coupling status signals to associated ones of the sensing inputs, means for producing clock pulses, means coupled to the matrix output for setting the time between successive clock pulses to a first period in response to an alarm on status signal and a second period in response to an alarm off status signal, means for coupling the clock pulses to the selection means for sequencing the selection means, first interfacing means responsive to the clock means for producing an output signal having a transition corresponding to each clock pulse, an alarm monitoring station, means for coupling the output signal to the alarm monitoring station, the alarm monitoring station including second interfacing means for receiving the output signal, means responsive to the period between transitions in the received output signal for detecting the on or off status of each alarm point, and means responsive to the detecting means for indicating the status of each of said alarm points.

14. The alarm system as set forth in claim 13 wherein the detecting means comprises means for detecting the transitions in the received output signal, means for setting a predetermined reference period intermediate said first and second periods, and means for comparing the period between successive transitions in the output signal to the predetermined period for determining if the period between transitions is longer than or shorter than the predetermined period.

15. The alarm system as set forth in claim 13 wherein the detecting means comprises means for detecting the transitions in the received output signal and for producing a trigger pulse in response to each of the detected transitions, a retriggerable multivibrator having a period intermediate said first and second periods, means for applying the trigger pulses to the trigger input of said multivibrator, whereby the multivibrator produces an output signal which corresponds to the status of the alarm points.

16. The alarm system as set forth in claim 15 wherein the indicating means comprises a serial input register having a data input coupled to the multivibrator output and a clock input for causing the register to shift, means for applying said trigger pulses to the clock input, and means including a plurality of light emitting diodes for visually displaying the data within said register.

17. The alarm system as set forth in claim 16 further including means responsive to the matrix for causing the clock means to produce an intercode signal between successive scans of the sensing inputs, means at said monitoring station for detecting the intercode signal, and means responsive to the detected intercode signal for causing the transfer of the data within said register to the visual display means.

18. The alarm system as set forth in claim 13 further including means for applying signals in a reporting station address pattern to predetermined ones of the sensing inputs, the monitoring station including means for detecting the address pattern, and an address display responsive to the detected pattern for displaying the reporting station address.

19. The alarm reporting system as set forth in claim 13 wherein the first interfacing means includes a relay having a coil responsive to the clock means and contacts for producing the output signal, and the second interfacing means includes another relay having a coil for responding to the output signal and contacts coupled to the detecting means.

* * * * *

UNITED STATES PATENT AND TRADEMARK OFFICE
CERTIFICATE OF CORRECTION

PATENT NO. : 3,940,739
DATED : February 24, 1976
INVENTOR(S) : Donald J. Ouimet

It is certified that error appears in the above-identified patent and that said Letters Patent are hereby corrected as shown below:

On the cover page, in the line beginning [75] Inventor:
Change the name Donald J. Quimet to Donald J. Ouimet Signed and Sealed this twenty-seventh Day of April 1976

[SEAL]

Attest:

RUTH C. MASON
Attesting Officer

C. MARSHALL DANN
Commissioner of Patents and Trademarks